United States Patent
Chang et al.

(10) Patent No.: US 7,134,184 B2
(45) Date of Patent: Nov. 14, 2006

(54) PROCESS OF MANUFACTURING A NARROW TRACK CCP HEAD WITH BIAS CANCELLATION

(75) Inventors: Jei-Wei Chang, Cupertino, CA (US); Koichi Terunuma, Saku (JP); Youfeng Zheng, San Jose, CA (US); Kochan Ju, Monte Sereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 283 days.

(21) Appl. No.: 10/706,838

(22) Filed: Nov. 12, 2003

(65) Prior Publication Data

US 2005/0099739 A1 May 12, 2005

(51) Int. Cl.
*G11B 5/23* (2006.01)
*G11B 5/187* (2006.01)

(52) U.S. Cl. .............................. 29/603.12; 29/603.15; 29/603.16; 29/603.18; 360/320; 360/324

(58) Field of Classification Search ............ 29/603.07, 29/606.12, 603.15, 603.16, 603.18, 603.11, 29/603.13, DIG. 16; 360/320, 324, 324.1, 360/324.11

See application file for complete search history.

(56) References Cited

U.S. PATENT DOCUMENTS

| 5,739,987 A | 4/1998 | Yuan et al. ............. 360/327.32 |
| 6,002,553 A | 12/1999 | Stearns et al. .............. 360/324 |
| 6,252,749 B1 * | 6/2001 | Hayakawa .................. 360/320 |
| 6,529,353 B1 | 3/2003 | Shimazawa .............. 360/324.2 |
| 6,577,124 B1 | 6/2003 | Coehoorn et al. .......... 324/252 |
| 6,597,546 B1 | 7/2003 | Gill ............................ 360/321 |
| 2002/0024775 A1 * | 2/2002 | Hasegawa ............ 360/324.1 X |

OTHER PUBLICATIONS

Matsuo et al., "Sub-Micron GMR Sensors with Verically Integrated Hard Magnet Biasing Applicable for High Temperature Operation", IEEE Transactions on Magnetics, vol. 37, No. 4, Jul. 2004, pp. 2001-2003.*

* cited by examiner

*Primary Examiner*—A. Dexter Tugbang
(74) *Attorney, Agent, or Firm*—Saile Ackerman LLC; Stephen B. Ackerman

(57) ABSTRACT

The problem of increased edge sensitivity associated with the reduction of the spacing between bias magnets in a CPP head has been solved by limiting the width of the bias cancellation layer and by adding an extra layer of insulation to ensure that current through the device flows only through its central area, thereby minimizing its edge reading sensitivity.

6 Claims, 4 Drawing Sheets

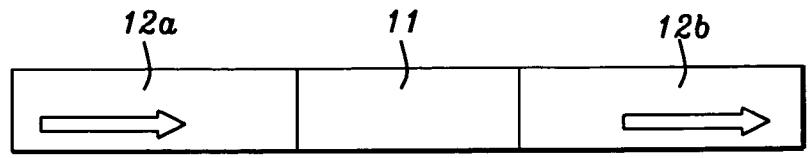
FIG. 1 - Prior Art
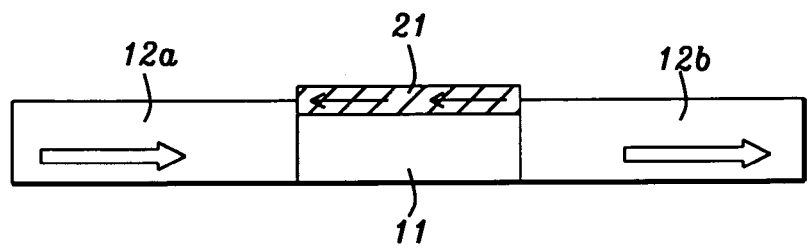
FIG. 2 - Prior Art
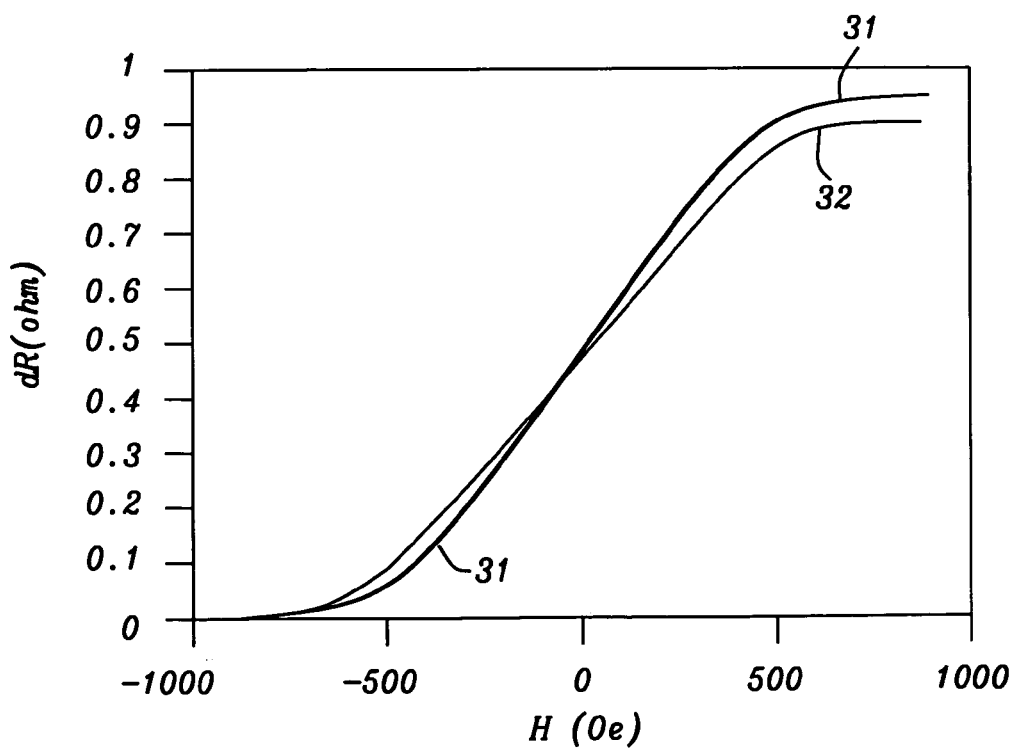
FIG. 3 - Prior Art

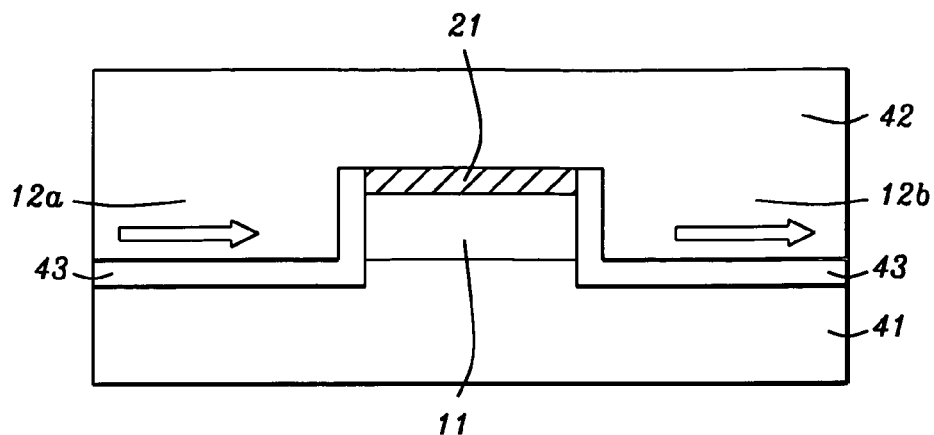
FIG. 4 – Prior Art
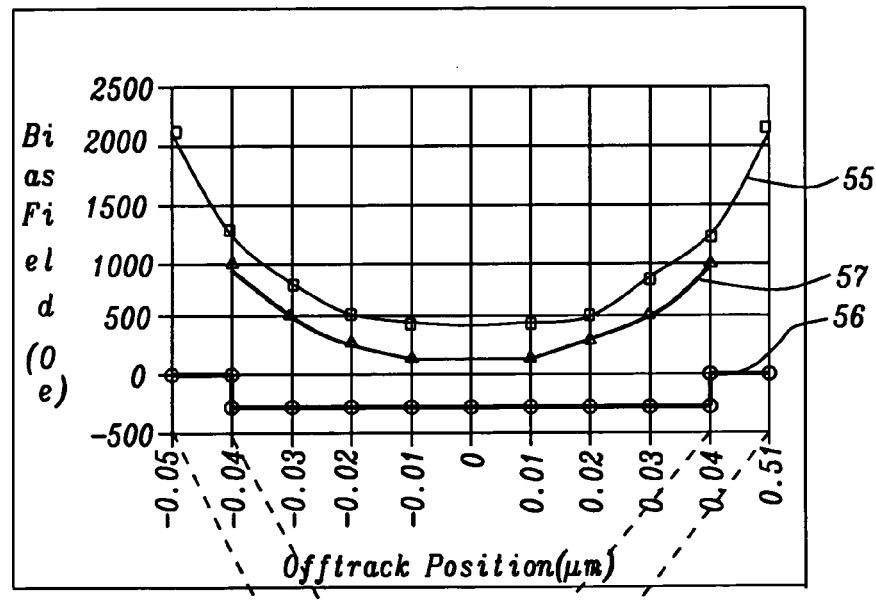
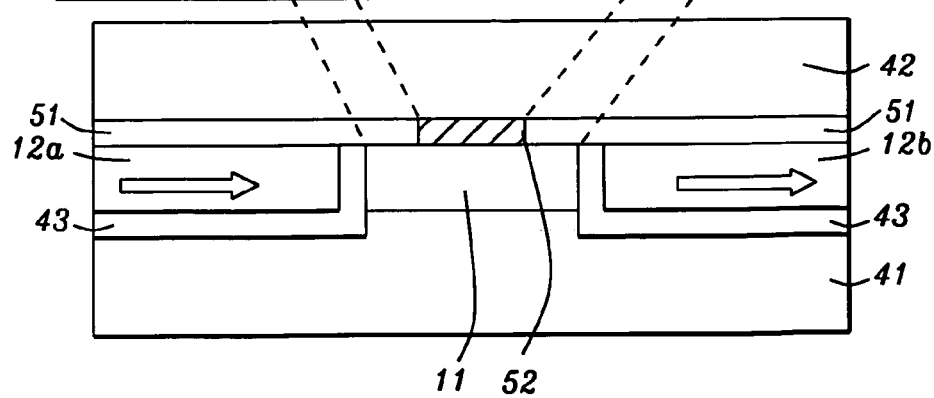
FIG. 5

PROCESS OF MANUFACTURING A NARROW TRACK CCP HEAD WITH BIAS CANCELLATION

FIELD OF THE INVENTION

The invention relates to the general field of magnetic read heads with particular reference to CPP heads in which the deleterious effects of longitudinal bias stabilization have been minimized.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a high coercivity ferromagnetic layer. The latter is usually formed out of a soft ferromagnetic layer that is pinned magnetically by a nearby layer of antiferromagnetic (AFM) material. This pinning effect can be attenuated, where necessary, by the insertion of an exchange dilution layer between the two. Alternatively, a synthetic antiferromagnet (formed by sandwiching an antiferromagnetic coupling layer between two antiparallel ferromagnetic layers) may be used to replace the ferromagnetic pinned layer.

When the free layer is exposed to an external magnetic field, the direction of its magnetization is free to rotate according to the direction of the external field. After the external field is removed, the magnetization of the free layer will stay at a direction, dictated by the minimum energy state, which is determined by the crystalline and shape anisotropy, current field, coupling field and demagnetization field. If the direction of the pinned field is parallel to the free layer, electrons passing between the free and pinned layers, suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

First generation GMR devices were designed so as to measure the resistance of the free layer for current flowing in the plane (CIP) of the film. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other GMR stack layers dominate and should be as low as possible.

Although the layers enumerated above are all that is needed to produce the GMR effect, additional problems remain. In particular, there are certain noise effects associated with these structures. Magnetization in a layer can be irregular because of reversible breaking of magnetic domain walls, leading to the phenomenon of Barkhausen noise. The solution to this problem has been to provide a device structure conducive to ensuring that the free layer is a single domain so that the domain configuration remains unperturbed after fabrication and under normal operation. This is achieved in the manner schematically illustrated in FIG. 1. Seen there is GMR stack 11 that is flanked by permanent (hard) magnets 12a and 12b that provide a stabilizing longitudinal field to stop the free layer breaking up into multiple domains at its outer edges.

However, as track widths grow smaller, the spacing between magnets 12a and 12b grows less so their effect extends further and further into the free layer which, in turn, brings about a reduction in signal strength. It has been shown that, for CIP heads, the signal sensitivity of a hard biased head can be increased by adding magnetic bias cancellation layer. Such a signal increase can extend the application of hard bias to a narrower track reader. In this type of bias cancellation AFM layer 21, as illustrated in FIG. 2, overlays the free layer. The AFM is used to generate an exchange field with opposite bias direction to cancel out the bias field generated by magnets 11a and 11b. By adjusting the exchange field strength (through inclusion of an exchange dilution layer as discussed above), one can produce a sensor with more of the free (sensing) layer available and thus more signal.

FIG. 3 compares normalized signal strength as a function of transverse field in a CIP head. Curve 31, measured from a head with bias-cancellation shows higher sensitivity than that of curve 31 which is for bias without cancellation.

For CPP applications, the current flows perpendicular to the sensor as seen in FIG. 4. As was the case for a CIP, AFM layer 21 can generate an exchange field having opposite bias direction to cancel out the bias field from hard magnets 12a and 12b. This enables the center portion of sensor 11 to have higher sensitivity and thus to produce a stronger signal when sensing current flows through the sensor. Also seen in FIG. 4 are top and bottom contact layers, 42 and 41 respectively, as well as insulating layer 43 that insulates the lower contact 41 from the magnets 12a and 12b.

A routine search of the prior art was performed with the following references of interest being found:

In U.S. Pat. No. 6,002,553, Stearns et al. disclose a sensor formed of alternating magnetic and non-magnetic materials. U.S. Pat. No. 6,597,546 (Gill) describes a tunnel junction sensor with AFM coupled flux guide. Coehoorn et al. (U.S. Pat. No. 6,577,124) show a sensor having FM layers with different uniaxial anisotropies. In U.S. Pat. No. 6,529,353, Shimazawa shows a hard magnet used to apply bias to a sensor while Yuan et al. (U.S. Pat. No. 5,739,987) disclose AFM layers providing transverse biasing to a sensor.

SUMMARY OF THE INVENTION

It has been an object of at least one embodiment of the present invention to provide a CPP GMR device having good signal strength as well as longitudinal stability.

Another object of at least one embodiment of the present invention has been that said device have minimal side reading effects.

Still another object of at least one embodiment of the present invention has been that said device be capable of running at higher currents to increase its signal but with minimal increasing in its side reading sensitivity.

A further object of at least one embodiment of the present invention has been to provide a process for manufacturing said device.

These objects have been achieved by using an AFM layer as a bias cancellation layer. Said bias cancellation layer does not extend all the way to the edges of the permanent magnets that supply longitudinal bias, but terminate short distances therefrom. A layer of insulation ensures that current through the device flows only through its central area, thereby minimizing its edge reading sensitivity.

BRIEF DESCRIPTION OF THE DRAWINGS

FIG. 1 is a schematic illustration of a GMR stack flanked by two permanent magnets that provide longitudinal stabilization.

FIG. 2 is FIG. 1 with the addition of a bias cancellation layer to improve signal output.

FIG. 3 plots normalized signal output as a function of the transverse field in a CIP head.

FIG. 4 is a more detailed depiction of FIG. 2.

FIG. 5 shows the device of the present invention coupled with a plot of the bias field as a function of off-track position.

DESCRIPTION OF THE PREFERRED EMBODIMENTS

The present invention discloses a CPP design with bias cancellation whose signal current has been constrained to flow through only the area where bias cancellation is taking place. This is accomplished through the introduction of two novel modifications to the prior art design that was shown in FIG. 4. As illustrated in FIG. 5, these are a reduction in the width of the bias cancellation layer (now seen as AFM layer 52) and the introduction of additional insulating layer 51 which serves to limit current flow to be through only the area that has bias cancellation.

Continuing our reference to FIG. 5, in the top half of that figure we have plotted the bias field as a function of position relative to the center of the read track. Curve 55 shows the hard bias field, curve 56 the hard bias cancellation field, and curve 57 the total field.

Figure 6:
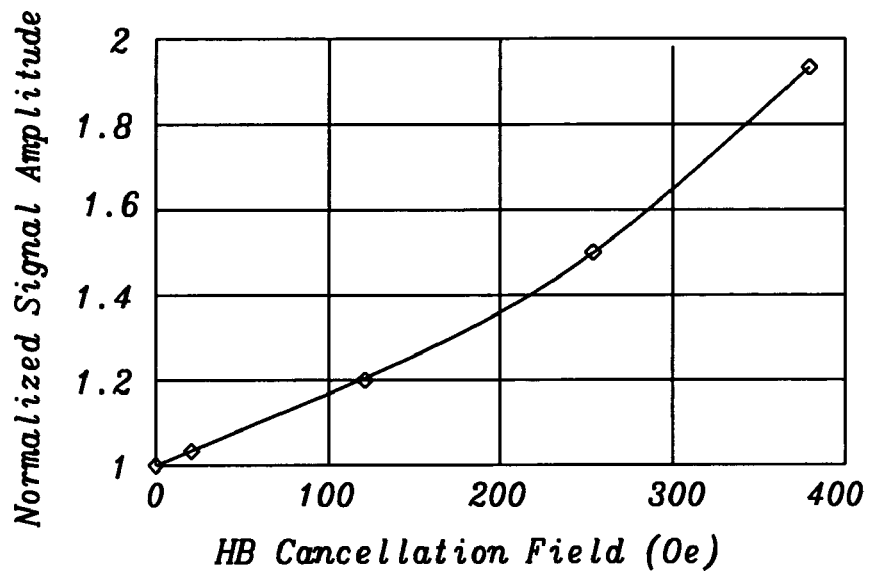
FIG. 6 is a plot of the normalized signal as a function the strength of the bias cancellation field.

Referring now to FIG. 6, using data obtained through micro-magnetic simulation we have plotted the normalized signal amplitude as a function of the hard bias cancellation field. This shows that the signal amplitude of this new structure increases almost linearly with the hard bias cancellation field strength.

Figure 7:
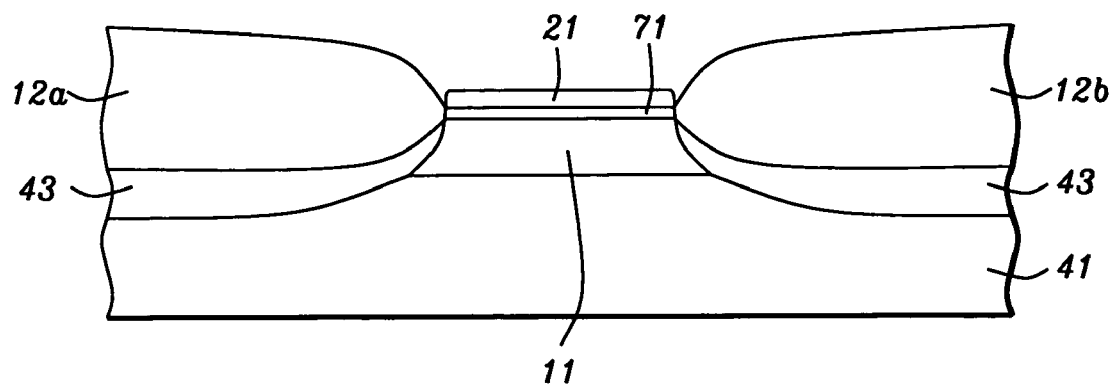
FIG. 7 shows an early stage in the process of the present invention.

Referring next to FIG. 7 we now begin a description of the process for manufacturing the new device. The process begins with the provision of a substrate (not shown) on which lower lead layer 41 is formed. The requisite layers to form a GMR stack are then laid down followed by an exchange dilution layer of, but not limited to, Cu, Ru, Cr, Rh, Ta, or laminates of two or more of these elements which is deposited to a thickness between about 5 and 20 Angstroms and an AFM, bias cancellation, layer of (but not limited to) IrMn, NiMn, PtMn, FeMn, or PdPtMn which is deposited to a thickness between about 30 and 150 Angstroms.

Then, stack, dilution layer, and AFM layer are patterned to form GMR stack 11, exchange dilution layer 71 and bias cancellation layer 21. As shown in the figure, GMR stack 11 has sloping sidewalls to allow good contact with dielectric layer 43 which is deposited next. This is followed by the deposition and patterning of a hard magnetic layer to form bias magnets 12a and 12b of, but not limited to, CoCrPt, CoCr, CoCrTa, CoCrPtTa, or CoCrNi.

After they have been magnetized, there is a magnetic field of between about 500 and 2,000 Oe at the inner edge of each hard magnetic layer and of between about 50 and 500 Oe at a point midway between these inner edges.

Figure 8:
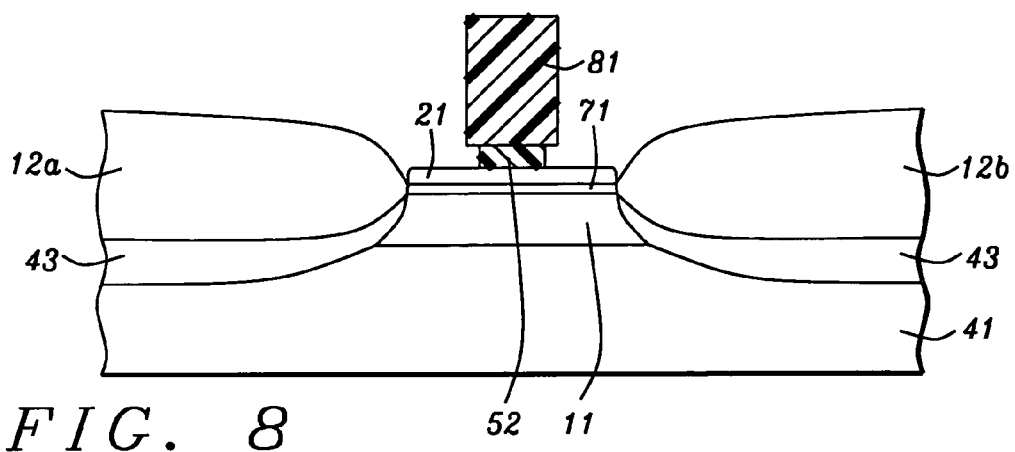
FIG. 8 shows placing a liftoff mask on the bias cancellation layer between the hard magnets.

Moving on to FIG. 8, liftoff mask 81 is then formed so that it covers a centrally located reduced length of bias cancellation layer 21 (between about 0.01 and 0.2 microns long) and leaves uncovered portions of 21 that extend inwards a distance from the inside edges of longitudinal bias hard magnetic layers 12a and 12b. Said distance is typically between about 0.01 and 0.2 microns.

Figure 9:
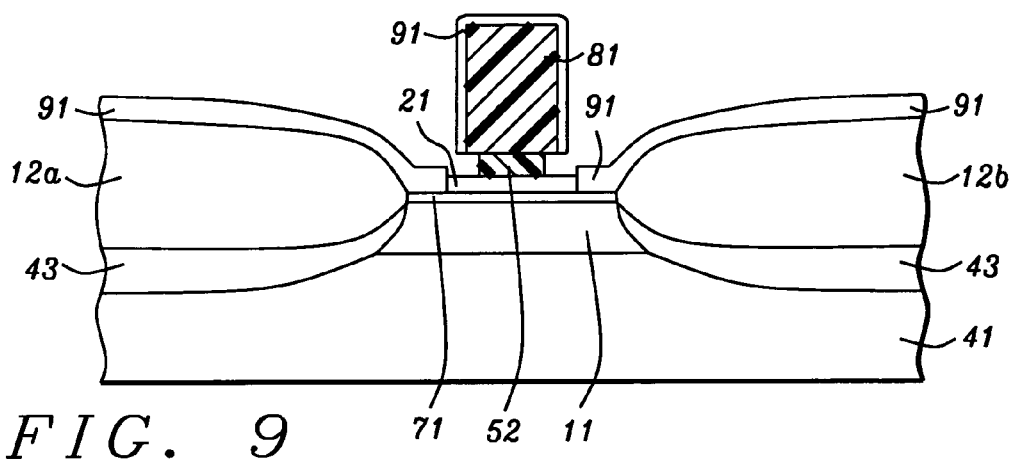
FIG. 9 shows the deposition of an additional insulating layer, followed by liftoff.
Figure 10:
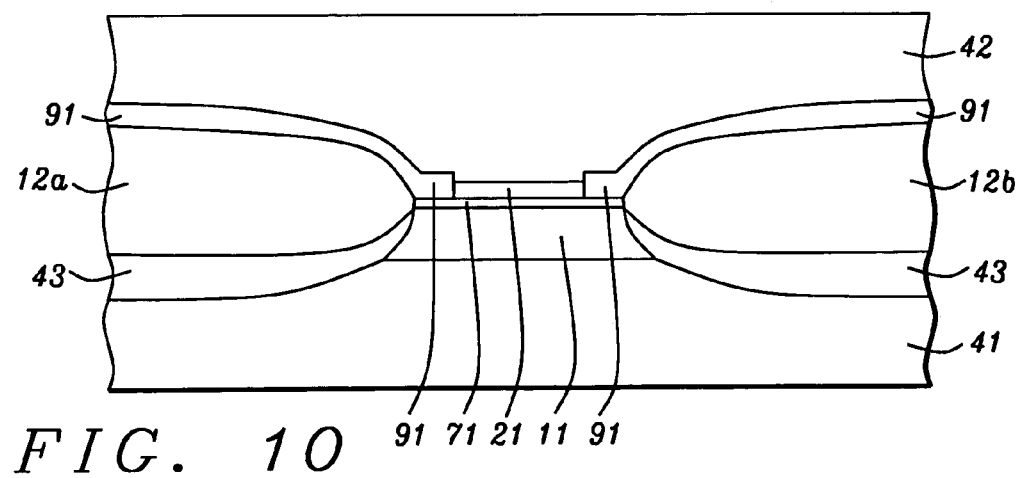
FIG. 10 shows the completed device.

Then, as shown in FIG. 9, second dielectric layer 91 is deposited on all exposed surfaces, following which mask 81 is lifted off, thereby exposing reduced length bias cancellation layer 21. Formation of the structure is completed with the deposition of top lead layer 42 on all exposed surfaces. The resulting GMR device has a signal strength that has increased by between about 10 and 100%.

In addition to the larger signal output provided by the read head of the present invention, it offers several other advantages:

1. Easy alignment: The addition of a second insulating layer (layer 51) with a centrally located opening in which the bias cancellation layer sits, makes alignment of the latter with respect to the GMR stack much easier.
2. Suppression of side-reading due to flux propagation: The continuity of the free layer will force the bias-cancellation portion to have coherent rotation when the edge region is exposed to a side track flux. The full strength field from the hard bias magnets along the edge portion can effectively suppress the edge region magnetization rotation.
3. Less current shunting: Sensor sensitivity at its edges is much reduced. Since current is now constrained to not flow through the edge portion, edge shunting effects are minimized.
4. Less instability induced by current: This design uses the center portion of the free layer as the sensor. The current induced circular field effects to edge portions will have less impact on the output signal, which will allow the CPP device to pump more current in order to get more signal.
5. Suppression of side-reading due to current spreading: Because current is constrained to not flow through the edge portion.
6. Reducing edge scattering effects: The magnetic edge is separated from the physical edge. The CPP GMR degradation due to lateral edge scattering can thus be reduced even for small size CPP devices.
7. Reducing the impact of process variations: This is because the magnetic active area is away from the physical edge region.

What is claimed is:

1. A method to increase GMR signal strength, comprising: providing a GMR stack having, on a top surface of the GMR stack, a bias cancellation layer located between opposing hard magnetic layers;

removing from said bias cancellation layer, portions that extend inwards a distance from said hard magnetic layers; and covering only said magnetic layers and all areas from which said portions were removed with a layer of insulation whereby current through said device is constrained to flow through a central area of said device.

2. The method described in claim 1 wherein said bias cancellation layer further comprises an antiferromagnetic layer on an exchange dilution layer.

3. The method described in claim 1 wherein said distance that said areas that formerly contained said removed portions extend inwards from said hard magnetic layers is between about 0.01 and 0.2 microns.

4. The method described in claim 1 wherein said hard magnetic layer is selected from the group consisting of CoCrPt, CoCr, CoCrTa, CoCrPtTa, and CoCrNi.

5. The method described in claim 1 wherein said bias cancellation layer is deposited to a thickness between about 30 and 150 Angstroms.

6. The method described in claim 1 wherein said GMR stack has a signal whose magnitude changes by between about 1 and 20% whenever a free layer of said GMR stack reverses magnetization direction.

* * * * *